United States Patent
Campbell (10) Patent No.: US 7,958,095 B1
(45) Date of Patent: *Jun. 7, 2011

(54) METHODS AND APPARATUS FOR COLLECTING AND PROCESSING FILE SYSTEM DATA

(75) Inventor: John Anderson Campbell, Canton, GA (US)

(73) Assignee: EMC Corporation, Hopkinton, MA (US)

( * ) Notice: Subject to any disclaimer, the term of this patent is extended or adjusted under 35 U.S.C. 154(b) by 76 days.

This patent is subject to a terminal disclaimer.

(21) Appl. No.: 12/466,265

(22) Filed: May 14, 2009

Related U.S. Application Data (63) Continuation of application No. 10/812,512, filed on Mar. 30, 2004, now Pat. No. 7,539,706.

(51) Int. Cl.
*G06F 7/00* (2006.01)
*G06F 17/00* (2006.01)

(52) U.S. Cl. .................................. 707/665; 707/654

(58) Field of Classification Search ............... 714/20
See application file for complete search history.

(56) References Cited

U.S. PATENT DOCUMENTS

| 6,173,418 | B1* | 1/2001 | Fujino et al. ............... 714/20 |
| 6,938,005 | B2* | 8/2005 | Iverson et al. ............. 705/27 |
| 7,082,441 | B1* | 7/2006 | Zahavi et al. ......... 707/999.202 |
| 7,734,750 | B2* | 6/2010 | Cannon et al. ............. 709/223 |
| 2005/0010619 | A1* | 1/2005 | Kassai ...................... 707/204 |
| 2005/0138317 | A1* | 6/2005 | Cannon et al. ............. 711/170 |

\* cited by examiner

*Primary Examiner* — Sathyanarayan Pannala
(74) *Attorney, Agent, or Firm* — Krishnendu Gupta; Gerald P. Kazanjian (57) ABSTRACT

A storage area network management application provides a data collection agent that processes storage information concerning storage entities such as file systems in a storage area network environment by receiving a data collection policy identifying storage information to be collected concerning a set of storage entities in a storage area network environment. The agent collects storage information concerning the set of storage entities according to the data collection policy and processes the collected storage information to produce at least one summary record of the storage information for the set of storage entities. The summary record(s) contain a summary of the collected storage information for the set of storage entities calculated according to the data collection policy. The agent transfers the summary record(s) from the data collection agent to a storage management application for presentation to a user of the storage management application. This offloads processing requirements of the management application to the agents.

20 Claims, 5 Drawing Sheets

METHODS AND APPARATUS FOR COLLECTING AND PROCESSING FILE SYSTEM DATA

RELATED APPLICATIONS

This continuation application is related to and claims priority to earlier filed U.S. patent application Ser. No. 10/812,512 entitled "METHODS AND APPARATUS FOR COLLECTING AND PROCESSING FILE SYSTEM DATA," filed on Mar. 30, 2004, now patented as U.S. Pat. No. 7,539,706, the entire teachings of which are incorporated herein by this reference.

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored within high capacity data storage systems. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems on behalf of client computers that request data from the servers.

A developer or administrator of such a storage area network environment may operate a storage area network management software application on a host computer system within the storage area network to manage or administer the various components (i.e., host computer systems, data storage systems, software processes, etc.) that operate within the storage area network. A network manager or administrator (i.e., a person) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems or devices within the storage area network, but that collectively interoperate together or in relation to one another to perform network management operations. As an example, conventional designs of storage area network management applications can include a console component that provide a graphical user interface for use by the administrator, a server component, several agent components, storage components and possibly other software components as well.

Generally, the server component operates as a central management control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Agent components execute on various host computer systems such as servers within the storage area network to manage and control storage area network entities (i.e., managed entities, resources or elements). As an example, there may be different respective agents specifically designed (e.g., coded) to remotely manage and control certain vendor-specific data storage systems, database applications, switches, and so forth.

More specifically, conventional agent components receive remote management commands from the server or console components and apply functionality associated with those management commands to the managed entities within the storage area network for which those agents are designated to manage. Agents are also responsible for periodically collecting configuration or management data concerning the storage area network elements that those agents managed. As an example, a conventional host or data storage system agent designed to managed file systems within a host computer system in the storage area network might operate on a host to collect file system information concerning files, directories or other data elements stored within file systems accessible to that host computer system. The agent can collect and report the list of files and associated file information (e.g. size of each file, creation date, owner, permissions, etc.) to a storage or server component that processes this information for presentation to the network manager (e.g., via the console component). Continuing with the file system example from above, the conventional storage component receives the collected file system data containing the list of files and associated file data from the agent. Upon receipt, the store or server components processes this information to calculate statistics on file system utilization within the host computer system from which that agent collected the data.

Example computations that the conventional store or server process can perform based on collected file system data include calculations to determine total used and free space capacity within the file system, percentages of total storage accessed by a host, and so forth. The storage area network manager or administrator can interact with the console component of the storage area network management application to obtain and view the calculated file system information in order to monitor performance of the file systems accessible to host computer systems in the storage area network and make determinations on the best use of available storage capacity.

SUMMARY

Conventional mechanisms and techniques for collecting and processing file system information from host computer systems in a conventional storage area network management application suffer from a variety of deficiencies. In particular, conventional storage area network management applications rely on agent processes that operate on host computer systems in the storage area network to exhaustively collect file system information that includes lists of all files and directories visible to the host computer system along with any file and/or directory metadata such as the size of each file or directory, date information for each file or directory (e.g., creation date, modification date, accessed the), and possibly other information concerning each file or directory (e.g., ownership, access permissions, etc.) for file system maintained on that host computer system. After collection, the conventional agent operating on that host transmits the collected file system information including file and directory metadata to a storage or server process operating within a management computer system that operates as part of the storage area network management application. The storage or server process on the management server receives and post-processes this agent-collected file system metadata information to calculate statistical or performance information concerning allocated and unallocated storage space within the file systems for the host computer system from which the agent collected the file system data.

While this conventional file system data processing methodology may be acceptable for a small number of agent processes that collect file system data on a relatively few number of host file systems for processing by the management server computer system, such conventional file system data collection and processing techniques do not scale well in large storage area network environments or in situations involving heavy processing loads or where processing of voluminous file system data is required for thousands or hundreds of thousands of files and directories. As an example, consider the conventional file system data processing architecture discussed above operating in a storage area network containing hundreds or even thousands of host computer systems that each maintained access to file systems containing thousands of directories and files. Conventional agent processes operating at each of these host computer systems must collect and exhaustive information on all files and directories within all file systems accessible to each host computer system and then must transfer this information to the storage or server process of the management application. Thereafter, the conventional server or storage component post-processes this bulk of information in order to derive the desired performance statistics concerning file system utilization within those host computer systems from which the data was collected. This conventional file system data processing architecture imposes a very significant burden on network bandwidth required to transfer the collected file system metadata for each file and directory from each collection agent to the storage or server process that then post-processes this data. In addition, since many conventional agents collect in transfer sets of file system data to the server or storage process for post-processing calculations, the processing burden imposed on the conventional storage or server process to arrive at the desired performance information concerning file system utilization within each host computer system in a large storage area network environment significantly impacts the overall performance of the storage or server process and reduces the ability of these processes to perform other operations related to effectively managing storage area network resources.

Embodiments of the invention significantly overcome such deficiencies and provide mechanisms and techniques for collecting, processing and presenting storage information concerning storage entities such as files, directories, file systems, volumes or the like in a storage area network environment without imposing undue burdens on storage area network bandwidth and storage or server processing resources. In particular, embodiments of the invention provided a file system data collection and processing architecture in which agent processes operating on individual host computer systems collect file system information (i.e., file metadata) relating to files and directories within file systems accessible to host computer systems in the storage area network environment. In addition to collecting such information, the agent processes of this invention are capable of pre-processing the collected file system metadata to produce summary records relating to age and size characteristics of the file systems in order to significantly reduce or offload post-processing requirements of such data performed by a server or storage process operating as part of the storage area network management application. In other words, embodiments of the invention provide a file system data processing architecture in which agent processes both collect and pre-process the collected file system metadata to reduce or boil this massive amount of information down to essential statistical information. By having the agent of this invention process the collected file system information locally, this offloads the processing burden of processing the data from the storage or server processes operating within the storage area network management application (i.e., operating on a central management computer systems). By distributing the file system metadata processing burden out into the agent processes, embodiments of the invention significantly increase performance of the storage area network management application by removing a conventional processing bottleneck that is created in conventional storage area network management applications in which the storage or server process must handle the complete processing of agent collected file system data.

In addition to simply collecting and pre-processing file system data, agent processes configured in accordance with embodiments of the invention provide the capability to collect file system data according to different data collection policies. In particular, the storage area network management application of this invention receives a data collection policy identifying storage information to be collected concerning a set of storage entities in the storage area network environment. This data collection policy can be transferred to and received by an agent process (i.e., part of this invention) responsible for collecting file system data associated with one or more host computer systems operating in the storage area network environment. As an example, the storage area network administrator can select define one or more data collection policies according to different levels of collection, such as a host level collection policy, a file system collection policy or a file set level collection policy depending upon the granularity of file system information desired. A host collection level indicates that the administrator desires to obtain summary information concerning all file systems related to one or more host computers, while a file system collection level indicates that the administrator desires to obtain information related to particular file systems. A file set collection level allows the user/administrator to define file selection criteria that include only files that match the criteria within the collection process. The data collection policy can include file filter criteria including, for example, file name portions, file owners, file ages, file sizes or other file filter criteria identifying file characteristics of files to be included within the set of storage entities from which storage information is to be collected.

Once the data collection policy is defined, an agent of this invention operates to process storage information concerning storage entities in a storage area network environment by receiving the data collection policy identifying storage information to be collected concerning a set of storage entities in the storage area network environment. The storage entities can be, for example, the file systems containing files or directories, or alternatively, can be other types of storage entities such as logical volumes, partitions, volume groups, devices, device groups, databases or the like. The agent collects storage information concerning the set of storage entities according to the data collection policy and processes the collected storage information to produce at least one summary record of the storage information for the set of storage entities. The summary record(s) contain a summary of the collected storage information for the set of storage entities calculated according to the data collection policy. As will be explained, there can be age and size summary records that indicate statistical information concerning the age and sizes of file and directories within file systems parsed according to the data collection policy. Once the agent reduces (i.e., calculates) the collected data by performing the calculations to produce the summary record, the agent transfers the summary record from the data collection agent to a storage management application for presentation (e.g., display via graphical user interface) to a user of the storage management application. Depending upon the embodiment of the invention, the management application (i.e., a storage or server process) can further perform post-processing of the summary record data, though the amount of such post-processing that may be required has been significantly reduced due to the agent processing of this invention.

In this manner, embodiments of the invention reduce the amount of processing required by the management application server or storage processes that receive collected data from the agents, since the collected data in this invention is pre-processed by the agents into the summary records as opposed to having the server or storage process handle all of such data processing (as is done in conventional designs).

Other embodiments of the invention include a computerized device, such as a server, management or host computer system, workstation or other computerized device configured to process all of the method operations disclosed herein as embodiments of the invention. In such embodiments, the computerized device includes a memory system, a processor, a communications interface and an interconnection mechanism connecting these components. The memory system is encoded with a software application (e.g. an agent or store process) that when performed on the processor, produces a corresponding process (e.g., an executing agent or storage process) that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below for both the agent and/or storage processes, alone or in combination with each other. More particularly, a computer program product is disclosed that has a computer-readable medium including computer program logic encoded thereon that when performed in a computerized device provides a associated operations of the agent and/or of the store process, each as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors, controllers or circuits in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes could run on a small set of dedicated computers, or on one computer alone.

It is to be understood that the system of the invention can be embodied strictly as a software program, as software and hardware, or as hardware alone. Example embodiments of the invention may be implemented within EMC's Control Center and/or storage scope software applications manufactured by EMC Corporation of Hopkinton, Mass., USA. Such applications provide management functionality for storage area network resources.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide a storage area network management application including agent processes that efficiently enable collection and agent-local pre-processing of storage information concerning a set of storage entities such as file system (e.g., file and directory information) accessible within host computer systems in the storage area network. A management application configured with agents according to this invention significantly reduces the burden on server or storage processes within the management application from a requirement to fully process collected storage information concerning file system data age and size characteristics.

Generally, agent processes configured according to embodiments of the invention are responsible for both collecting and pre-processing storage information such as file system metadata (e.g., file and directory sizes, date information, ownership information, and the like) related to the files and directories within the file systems accessible to one or more host computer systems in a storage area network. The agent processes of this invention collect file system metadata and processes this information, for example, to calculate or tabulate averages or summations that indicate an amount of data within file systems that is aged into various age ranges, such as zero to thirty days, thirty to sixty days, and so forth. Other calculations can indicate, for example, file system access or history information identifying percentages and sizes of data within a file system that has not been accessed within certain age ranges (e.g., thirty percent of a file system has not been accessed in the past sixty days). Agents can traverse and parse file system metadata and perform calculations on this collected storage information to produce age and size summary records that convey this type of information. This information can indicate percentages of storage used or free, amount of use and free storage, size and age ranges of used and free space and the like. Other information that an agent of this invention can produce includes, for example, the X (where X is an integer number, such as 10) largest files within a file system, the Y largest directories, the Z oldest files, the P oldest directories, and so forth. It is to be understood that these are examples of information that can be provided by agent operating according to embodiments of the invention and the invention is not strictly limited to these specific types of calculations.

By collecting and processing file system metadata in this manner, embodiments of the invention significantly reduce processing requirements of a management server computer system to store such information within a management information database. Once the agents configured in accordance with embodiments of the invention have collected and processed the file system metadata (i.e., to calculate values such as those in the above example), the agents produce one or more summary report records that contain the results of the agent pre-processing calculations. As an example, age summary records can indicate, for example, amounts of data stored within file systems classified according to how old that data is within that file system. Size summary records can indicate, for example, a set of largest and smallest files and/or directories within particular file systems, total amounts of used and free space, and other relevant information. After the agents have processed the collected storage information to produce the age and size summary records, the agents transmit the summary records to the management application (e.g., to a storage process that saves this information in a database) for access by a network administrator. The management application storage process can also perform post-processing on the summary records to further derive or calculate file system characteristics based on the agent pre-processed data. In other words, in one embodiment of the invention, the agent collects and pre-processes file system metadata, for example, to reduce the size of the data to be transferred for post-processing by the storage process (operating as part of the management application). Thereafter, the storage process receives the pre-processed agent size and age summary records and can perform further processing on this data to present file system statistics for display to the administrator.

Since the agent processes of this invention perform preprocessing of the data within host computer systems distributed throughout the storage area network, the post-processing required by the storage process is significantly reduced as compared to conventional storage area network management applications that perform all processing of collected data within a storage process that is separate from the agent process. Accordingly, performance of the management application server that operates the storage process in this invention is significantly improved by reducing the processing burden from distributing this burden to the agent processes provided in accordance with embodiments of the invention.

Figure 1:
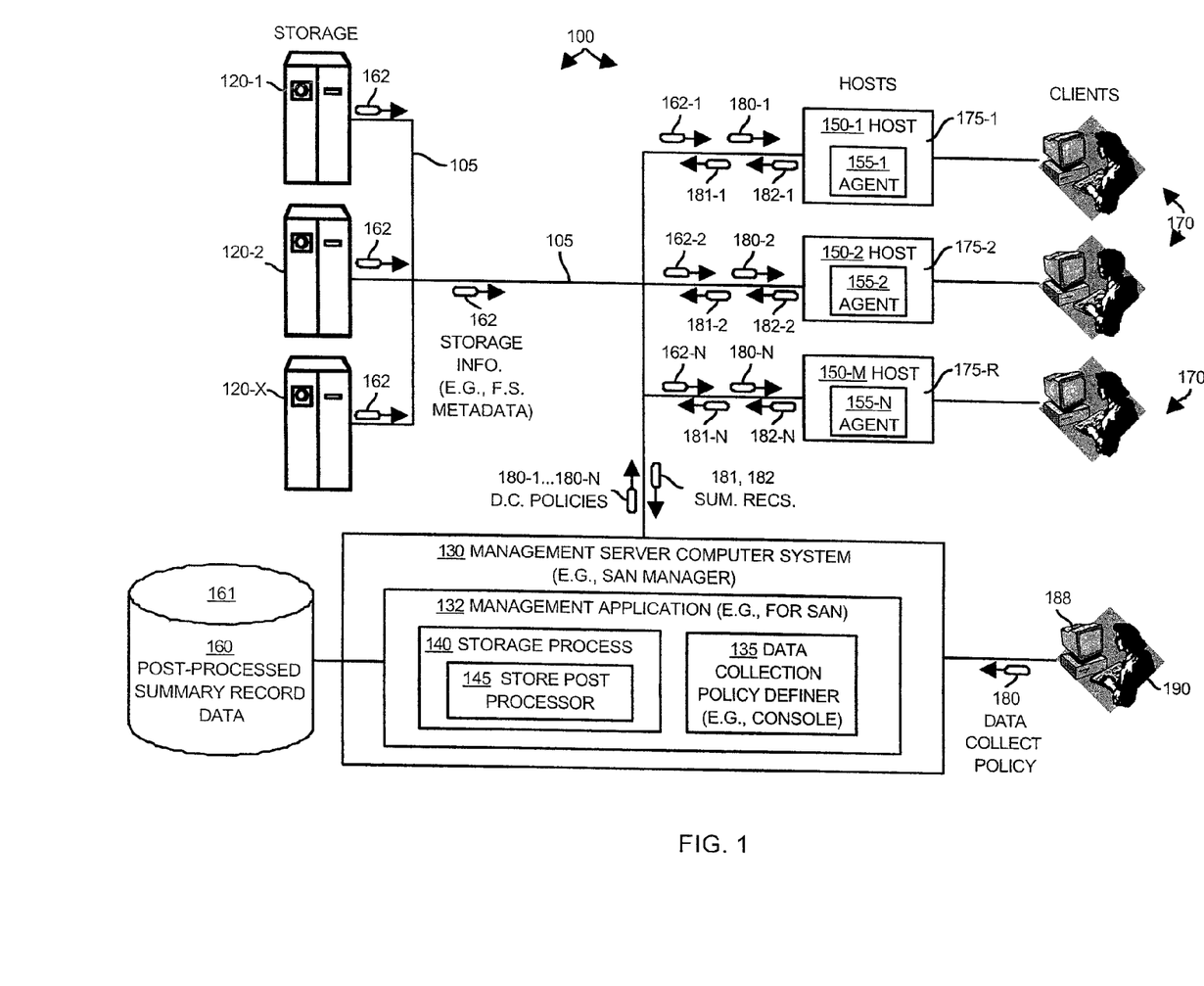
FIG. 1 illustrates an example storage area network and computing system environment including an agent and network management application configured to operate according to embodiments of the invention.

FIG. 1 illustrates an example of a networking environment suitable for use in explaining example embodiments of the invention. In this example, the networking environment is a storage area network 100 that includes a communications medium 105 that interconnects a plurality of data storage systems 120-1 through 120-X to a plurality of host computer systems 150-1 through 150-M. According to the general operation of the storage area network 100 shown in FIG. 1, client computer systems 170 operate various client software applications (not specifically shown) that communicate with server applications (not specifically shown) operating within the host computer systems 150 in order to access data stored within the data storage systems 120 over the storage area network 100. The host computer systems 150 provide (e.g., execute) an operating system that presents data stored within the data storage systems 120 as one or more storage entities 175-1 through 175-R. The storage entities 175 in this example are file systems that the host computer systems 150 use to store files and directories of data within the data storage systems 120.

As also illustrated in this example storage area network 100, a management server computer system 130 operates a management application 132 (e.g., a storage area network management application) that includes a data collection policy definer 135 (i.e., a process for defining the data collection policy 180) and a storage process 140 each configured in accordance with embodiments of the invention. The storage process 150 includes a store post processor 145 that maintains post-processed summary record data 160 within a management information database 161 accessible to the management application 132. More specific details of operation of the storage process 140 including post-processing operations will be explained shortly.

Each host computer system 150-1 through 150-M operates (e.g., executes, runs, interprets or otherwise performs) a data collection agent process 155-1 through 155-N (i.e. agents) also configured in accordance with embodiments of the invention. The data collection agent processes 155 are generally considered part of the management application 132. Generally, the agents 155 operate to collect and process information about managed resources such as the data storage systems 120 within the storage area network 100 and report this information to the management application 132. A network manager or administrator 190 (i.e., a person responsible for managing storage area network 100) operating a management computer system 188 can access the management application 132 executing within the management server computer systems 130 as will be explained to view the information collected and processed by the agents 155 to determine performance of the resources within the storage area network 100.

According to the general operation of embodiments of the invention, the network administrator 190 is able to access the data collection policy definer process 135 that operates as part of the management application 132 in order to define, specify or otherwise input a data collection policy 180 to be associated with one or more (i.e., each of) of the data collection agents 155 or hosts 150. The data collection policy 180 specified by the network administrator 190 allows the administrator 190 to define parameters that indicate what storage information the data collection agents 155 are to collect and process. As an example, an administrator 190 can specify a data collection policy 180 to indicate how often to collect storage information concerning file systems maintained by the host computer systems 150. In addition, the administrator 190 can specify different data collection levels that identify a specific set of files corresponding to the file systems from which storage information is to be collected by the agent processes 155. In one embodiment for example, the administrator may specify a "host collection level" for a particular host computer system 150-1 (or set of hosts) operating a data collection agent(s) 155. The host collection level specifies that the agent 155-1 is to collect storage information concerning the entire set of file systems maintained by the host computer system(s) 150-1. In an alternative embodiments of the invention, the administrator 190 can specify a "file system collection level" or a "file set collection level" that each indicate a data collection policy 180 that instructs one or more data collection agents 155 to collect and processed file system information concerning host computer systems 150 at different levels of granularity. As an example, the file system collection level specifies that an agent 155 is to collect information concerning files and directories within specific file systems 175 for each host computer system 150.

To illustrate an example of the differences between the host collection level and a file system collection level, for a host collection level, the data collection policy 180 may indicate that a data collection agent 155 of this invention is to collect storage information 162 for file systems maintained by that host computer system and for each of those file systems, the agent 155 is to produce summary records 181, 182 that indicate for that host computer system, the top ten largest files within any of the file systems 175 maintained by that host 150, the top ten oldest files within any file systems 175 maintained by that host 150 and so forth. In contrast, a file system collection level provides similar information for the administrator 190 but for specific file systems 175 maintained by a host. In other words, the host collection level causes an agent 155 to collect and processed storage information 162 across all file systems associated with a host computer system 150 where is a file system collection level allows the administrator 190 to indicate to an agent 150 information to cause that agent to collect and processed storage information on a file system by file system basis within one or more host computer systems 150.

In addition, other embodiments of the invention provide an even finer level of granularity by allowing the administrator 190 to specify a file set collection level within the data collection policy 180. A file set collection level allows the administrator to define a file set which is generally a grouping of files based on file system criteria such as filename masking, file ownership, a domain associated with a file, an age of a file, a size of a file, or other information they can be used to generally filter files within a file system. As such, by specifying a file set collection level within the data collection policy 180, the administrator 190 is able to cause the data collection agent 155 to collect storage information only those specific files that correspond to the file set collection level parameter information specified by the data collection policy 180. This allows the administrator to operate embodiments of the invention to produce age and size summary record information associated with specific types of files that may exist within any file systems of one or more host computer systems 150. As an example, a data collection policy 180 specifying a file set collection level that indicates a filename masking parameter such as "*.mpg" can instruct a data collection agent 155 to collect age and size summary record information associated with all MPEG files stored within file systems associated with one or more host computer systems 150. The specifics of information provided by age and size summary records will be explained shortly.

Once the administrator 190 specifies a data collection policy 180, the management application 132 can provide the data collection policy 180 to one or more agents 155 by transferring the data collection policy 180 over the network 105. Note that a single data collection policy 180 may be specific to one agent 155 or one host computer system 150 or alternatively, the data collection policy 180 may be applicable to multiple host computer systems 150 and/or multiple data collection agents 155. Each agent 155 interprets the information specified by the data collection policy 180 in order to collect and process file system metadata information concerning files and directories of file systems maintained by the host computer systems 150. The agents 155 process the collected storage information 162 associated with files and directories in order to determine the age ranges as well as size information concerning the size of those files and directories. The data collection agent 155 can maintain counters to track such things as the top ten largest files, the top ten oldest files, the top ten largest directories and so forth. Note that "ten" is used by way of example only and the data collection policy definer 135 allows the administrator 190 to numerically define how much detail the agent 155 is to collect concerning file systems for that host computer system 150.

The agent 155 processes collected storage information 162 to produce summary records 181, 182 of the storage information for the file systems 175 associated with a host computer system 150. This can include, for example, calculating averages associated with file systems such as the average size of files with any particular directory or file system, percentages of files accessed within certain time periods (i.e., date ranges) for that host, percent or amounts of storage utilized by a host within some or all file systems depending upon the collection level specified, total amounts of storage exceeding predefined storage limits (e.g., total amounts of files >250 MB in size), and the like. The agent 155 transfers the calculated summary records 181, 182 to the storage process 140 operating within the management application 132 for presentation to the administrator 190 of the storage management application 132. In this manner, the processing burden of the storage process 140 is significantly reduced. In one embodiment of the invention, the storage process 140 receives and stores the summary record information 181 and 182 into the management information database 161. Alternatively, in another configuration the storage process 140 includes a storage post processor 145 that performs further calculations (in addition to those calculations performed by the agents 155) on the age and size summary records 181 and 182 received from the agent processes 155.

Further details of processing operations performed by embodiments of the invention will now be explained with respect to a series of flow charts that show specific processing steps performed primarily by the data collection agent 155 configured in accordance with embodiments of the invention to offload processing of storage information from management application 132.

Figure 2:
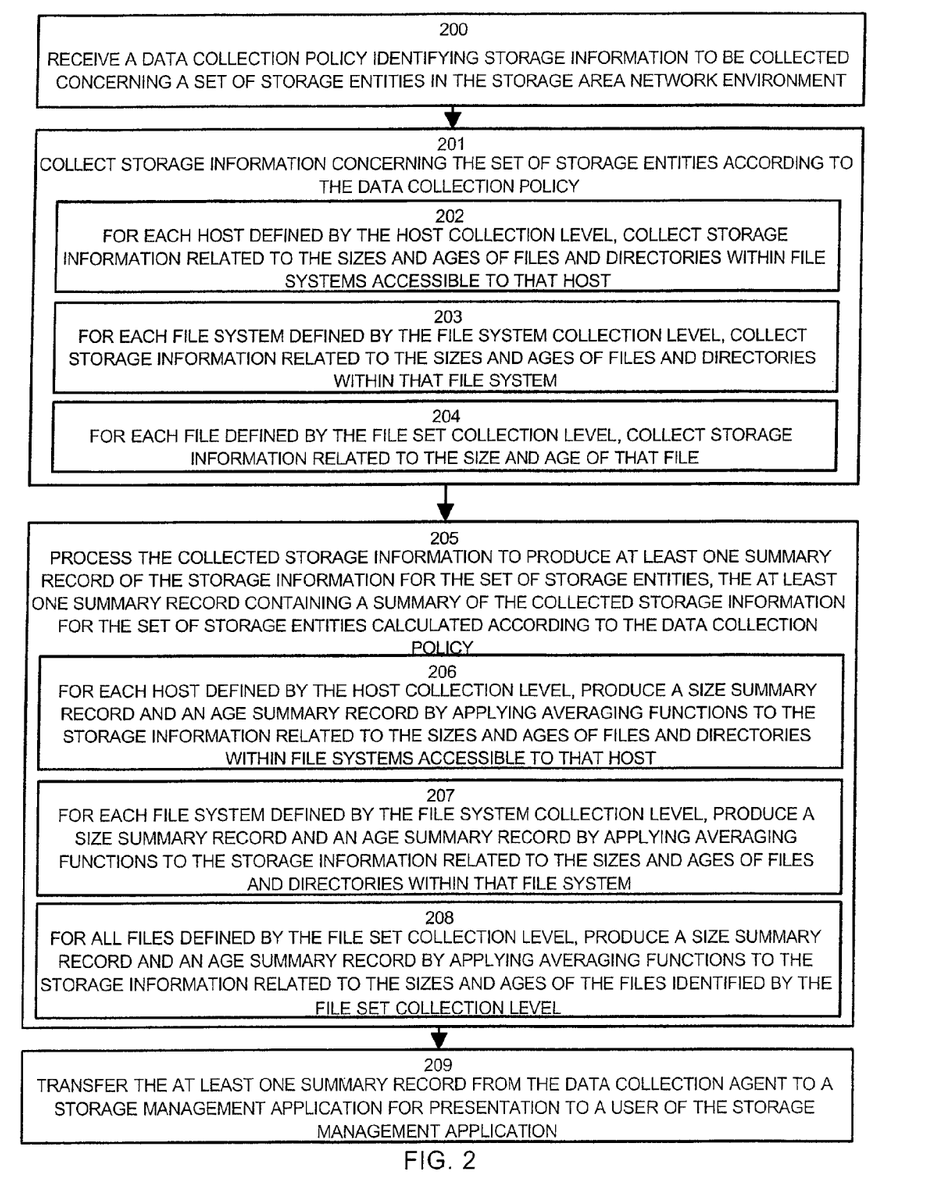
FIG. 2 is a flow chart of processing steps that show the general operation of an agent process configured to collect and process storage information according to embodiments of the invention.

I FIG. 2 illustrates general processing steps that a data collection agent 155 performs for processing storage information 162 collected from storage entities 175 such as file systems in a storage area network environment 100. Specific details of certain of these processing steps will be explained thereafter in more detailed flow charts.

In step 200, the agent 155 receives a data collection policy 180 identifying storage information to be collected concerning a set of storage entities such as file systems maintained by hosts 150 in the storage area network environment 100. As explained above, the data collection policy 180 generally defines parameters indicating a granularity or level of collection of file system information to be performed by the data collection agent 155. It is to be understood that the set of storage entities 175 in one example embodiment are file systems maintained by host computer systems. In an alternative configuration, the set of storage entities 175 from which storage information is to be collected by the agent 155 can be, for example, volumes, raw partitions, devices, databases, mirrored disks, disk drives, backup media, computer readable media (e.g., memory based storage, RAM, ROM, etc.) or any other type of storage entity accessible by a host computer system 150 within the network environment 100. The storage entities 175 can either be maintained locally within storage devices such as disk drives directly installed within the host computer systems 150 or, as illustrated in the configuration in FIG. 1, the storage entities 175 can be stored within data storage systems 120 coupled to the host computer systems 150 via a storage area network communications medium 105 such as a high-speed Fibre-channel, SCSI or other type of communications link. For purposes of description of example embodiments of the invention, the storage entities 175 will be considered file systems maintained by host computer systems 150 within the data storage systems 120, though this is not intended to limit the scope of this invention.

Next, in step 201, the agent 155 collects storage information 162 concerning the set of storage entities according to the data collection policy 180. In one embodiment of the invention, the data collection policy 180 can specify different collection levels such as a host collection level, a file system collection level and/or a file set collection level. Further details of the collection of storage information 162 based on the specified collection level will be explained in sub-steps 202 through 204.

In sub-step 202, for each host 150 defined by a host collection level, the agent collects storage information related to the sizes and ages of files and/or directories within file systems 175 accessible to that host 150. In other words, if the data collection policy 180 specifies a host collection level, the agent 155 operates to collect information defined by parameters within the data collection policy 180 for all file systems accessible to or maintained by that host computer system 150.

In sub-step 203, for each file system 175 defined by (i.e., matching) a file system collection level, the agent 155 collects storage information related to the sizes and ages of files and directories within that file system 175. Accordingly, if the data collection policy 180 specifies a file system collection level, the agent 155 operates to collect information defined by parameters within the data collection policy 180 for only those specific file system(s) 175 identified by that file system collection level. This may be less than all the file systems accessible to a particular host computer system 150.

In step 204, for each file defined by a file set collection level, the agent 155 collects storage information related to the size and age of that file. In other words, if the data collection policy 180 specifies a file set collection level, the data collection policy 180 can include parameters that identify certain file characteristics that will allow an agent 155 to identify specific set of individual files within one or more file systems maintained by host computer system 150 for which storage information is to be collected. As briefly explained in example above, the file set collection level can define file parameters such as a wild-card file name string that matches a set of different files (e.g., *.MPG, *.JPG, *.MP3, etc.), date ranges of files (e.g., creation, modification and access dates), size ranges of files, file owners, mailbox names, application creators, directory or path specifications, and the like. Using one or more of these file set collection level parameters defined in by the administrator 190 in the data collection policy 180, the agent 155 is able to gather storage information for the production of age and size summary records for only those files that match the file set collection level parameters.

Next, in step 205, the agent 155 processes the collected storage information to produce at least one summary record of the storage information for the set of storage entities corresponding to the data collection policy 180. In the illustrated example, the agents 155 produce size and age summary record(s) 181, 182 that contain a summary of the age and sizes of collected storage information for the set of storage entities 175 calculated according to the data collection policy 180. Generally, a summary record contains the results of pre-processing that the agent 155 performs on the collected storage information 162 gathered based upon the data collection policy 180. Sub-steps 206 through 208 define general processing steps performed by the agent 155 depending upon the collection level specified by the data collection policy 180 in order to produce summary records for age and size information calculated or derived from the collected storage information 162.

In sub-step 206, for each host defined by the host collection level, the agent 155 produces a size summary record 181 and an age summary record 182 by applying averaging functions to the storage information related to the sizes and ages of files and directories within all file systems 175 accessible to that host 150 to correspond to the data collection policy 180.

In sub-step 207, for each file system defined by the file system collection level, the agent 155 produces a size summary record 181 and an age summary record 182 by applying averaging functions to the storage information related to the sizes and ages of files and directories within that file system 175 (or file systems) corresponding to (i.e., that match) the data collection policy 180.

In sub-step 208, for all files defined by the file set collection level, the agent 155 produces a size summary record 181 and an age summary record 182 by applying averaging functions to the storage information related to the sizes and ages of the files 175 identified by the file set collection level.

After processing of step 205 and sub-steps 206 through 208 are complete, the agent 155 has pre-processed the collected storage information 162 in order to calculate age and size summary records 181 and 182 that summarize the collected storage information 162. This summarization process significantly alleviates processing that would otherwise be required by the storage process 140 to process the collected storage information 162 in order to derive the required age and size information for reporting purposes. In other words, the processing of step 205 significantly reduces the processing burden required by the storage process 140 within the management application 132. By distributing this processing out to each agent process 155 operating within the host computer systems 150 within the storage area network 100, the management application 132 does not serve as a bottleneck for processing the collected storage information 162 from many agents 155, as happens in conventional systems.

Next, in step 209, the agent 155 transfers the summary records 181 and/or 182 from the data collection agent 155 to a storage management application 132 for presentation to a user 190 (e.g., the administrator in the illustrated example in FIG. 1) of the storage management application 132. In this manner, embodiments of the invention provide a processing load balancing technique that distributes processing of agent collected storage information data amongst the agents 155 as opposed to concentrating all of such processing within the management application 132. It is to be understood by those skilled in the art that any suitable data structure can be used for the age and size summary records 181 and 182. In addition, it should be readily understandable by those skilled in the art that each agent process 155 configured in accordance with embodiment of the invention operates, for example, as a software program that is capable of traversing the file systems 175 or other data storage structures maintained by a host computer system 150 and is able to identify files or other data portions that match the collection criteria specified by the data collection policy 180.

As in example, if the data collection policy specifies a host collection level, the agent or able to traverse and parse file system information for all files associated with each host computer system 150. Parsing and file system traversal can include, for example, identifying sizes of particular files as well as creation, access and modification dates associated with those files. The agents 155 are able to keep running tabulations or counters of the number and sizes of all files encountered during the traversal and parsing of the file system 175. In addition, differences between the creation dates of files and the present time and date of execution of the collection of storage information can provide an indication of the age of files. The agent processes are able to keep running calculations on such age and size information in order to produce the agent size summary records. Upon completion of parsing of a file system 175, the agents 155 perform any necessary post-processing calculations such as averaging of age and size information. In addition, the processing provided by embodiments of the invention can include classifying average age and sizes of files according to various date ranges such that age and size summary records indicate, for example, the average size of files within multiple date ranges. In addition, the agent processing is able to maintain specific file or directory identifiers to identity, during file system parsing, a set of the largest or oldest files that match the data collection policy 180.

Further details of processing operations performed by embodiment of the invention to collect and process storage information 162 will now be explained in additional flow charts.

Figure 3:
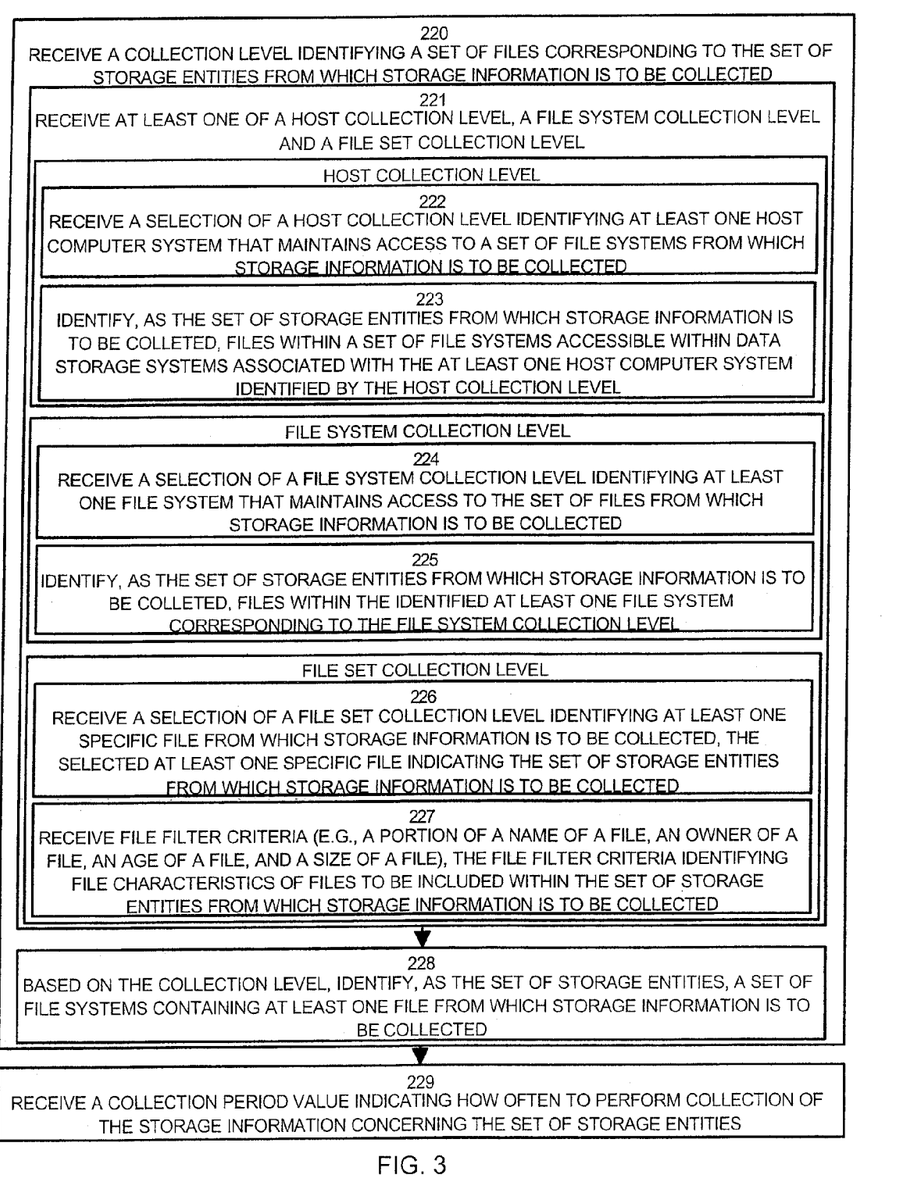
FIG. 3 is a flow chart of processing steps that show details of receiving a data collection policy according to embodiments of the invention.

FIG. 3 is a flow chart of processing steps that show processing details performed by a data collection agent 155 configured in accordance with the system of the invention to receive a data collection policy 180 identifying storage information to be collected concerning a set of storage entities 175 such as file systems in the storage area network environment. In other words, the processing steps in FIG. 3 show the details of step 200 from FIG. 2 in accordance with one example embodiment of the invention.

In step 220, the agent process 155 receives a data collection policy 180 identifying a set of files corresponding to the set of storage entities 175 from which storage information is to be collected.

In step 221, the agent 155 receives an identification of a host collection level, a file system collection level or a file set collection level. Sub-steps 222 and 223 (below) correspond to receiving a host collection level while sub-steps 224 and 225 correspond to receiving a file system collection level whereas sub-steps 226 and 227 correspond to receipt of a file set collection level.

In step 222, the agent 155 receives a selection of a host collection level identifying at least one host computer system that maintains access to a set of file systems from which storage information is to be collected.

In step 223, the agent 155 identifies, as the set of storage entities 175 from which storage information is to be collected, files within a set of file systems 175 accessible within data storage systems associated with at least one host computer system 150 identified by the host collection level 180. Accordingly, for this example embodiment of the invention, the host collection level indicates that an agent 155 is to collect storage information concerning all file systems accessible to a particular host computer system 150.

In step 224, the agent 155 receives a selection of a file system collection level identifying at least one file system that maintains access to the set of files from which storage information 162 is to be collected.

In step 225, the agent 155 identifies, as the set of storage entities from which storage information is to be collected, files within the identified file system(s) corresponding to the file system collection level. As such, for a file system collection level, the data collection policy 180 specifies one or more file systems from which storage information 162 is to be collected. The file system collection level thus allows the administrator 190 of the storage area network to obtain size and age summary record information concerning only those file systems of interest to that administrator 190.

In step 226, the agent 155 receives a selection of a file set collection level identifying at least one specific file from which storage information is to be collected. The selected specific file(s) indicate the set of storage entities from which storage information is to be collected. To identify a specific file, the data collection policy 180 can include file filter criteria that the administrator 190 is able to specify to define what files are to be included in the set of storage entities 175 for which storage information is to be collected.

In sub-step 227, the agent 155 receives file filter criteria including one or more of the following criteria: i) a portion of a name of a file; ii) an owner of a file; iii) an age of a file; and/or iv) a size of a file. The file filter criteria identify file matching or masking characteristics of files to be included (or excluded) within the set of storage entities from which storage information is to be collected. The agent 155 can use the file filter criteria to exclude or include files. In alternative embodiments of the invention, the file filter criteria can be specified in addition to a host or file system collection level in order to allow the administrator 190 to indicate, within the data collection policy 180, for example, that all file systems associated with a host are to be traversed for the collection of storage information 162 (i.e., the host collection level as explained above) but that the file filter criteria is to be applied to select only, or to exclude only those files within all of the host file systems 175 that match the file filter criteria.

In other words, the file filter defined in step 227 may be included within the specification of the data collection policy 180 in which the administrator 190 (i.e., a user) has identified a host or file system collection level in order to further refine the granularity at which storage information 162 is to be collected concerning those files that match or that do not match the file filter criteria.

Next, in step 228, based on the collection level, the agent 155 identifies, as the set of storage entities 175, a set of file systems containing at least one file from which storage information is to be collected. In other words, in step 228, upon receipt of the data collection policy 180 containing either a specification of a host collection level, a file system collection level or a file set collection level and possibly file filter criteria, the agent 155 is able to traverse or parse file systems matching his information in order to collect any required storage information. In step 228, the specific file systems containing the particular files that match the information specified in a data collection level 180 can be readily identified by the agent 155 using, for example, standard file system operating system calls for access to file and directories within the file systems 175.

According to this example embodiment of the invention, in addition to containing file selection information in the form of a collection level, the data collection policy 180 can further define the collection period that the administrator 190 can specify to indicate how frequently storage information 162 is to be collected by the agent 155. This is illustrated in step 229 in which the agent 155 receives a collection period value indicating how often to perform collection of the storage information concerning the set of storage entities 175.

Example collection period values can be, for example, very small such as a number of seconds or can be larger time values such as minutes, hours, daily, nightly, weekly and so forth. In this manner, the data collection policy 180 identifies a collection period indicating how often the agent 155 is to perform collection of storage information 162.

Figure 4:
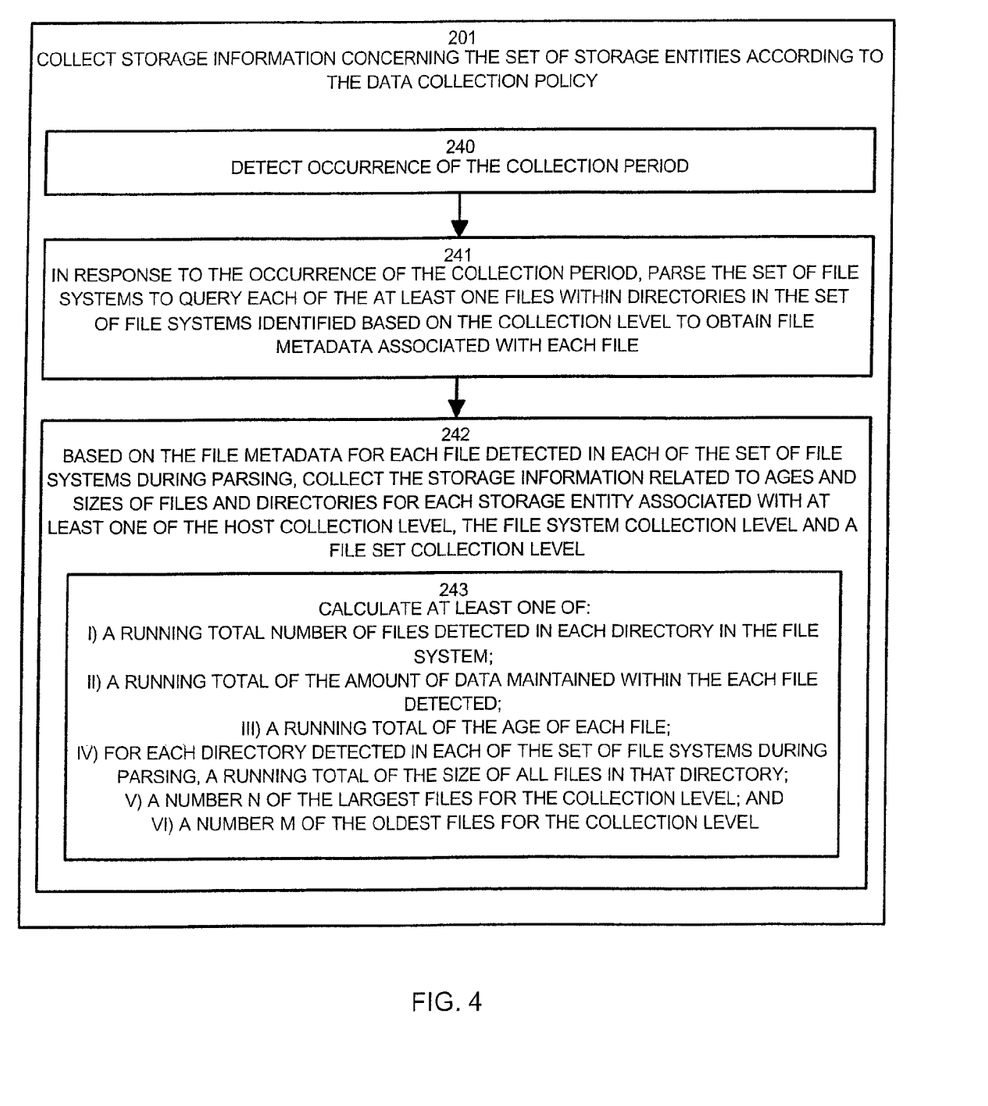
FIG. 4 is a flow chart of processing steps that show details of collecting storage information from storage entities according to the data collection policy in accordance with embodiments of the invention.

FIG. 4 is a flow chart of processing steps that an agent configured according to embodiments of the invention performs to collect storage information concerning storage entities according to the data collection policy 180. That is, the flow chart of FIG. 4 shows details of step 201 from FIG. 2.

In step 240 the agent 155 detects the occurrence of the collection period. Recall from step 229 above that during the operation of defining the data collection policy, the administrator 190 is able to specify a data collection period. As an example, this period may be once per day. Accordingly, in step 240, the agent 155 detects the expiration of a data collection period and begins the process of collecting the required storage information based on the data collection policy 180. This processing will be repeated upon each occurrence of the data collection period.

In step 241, in response to the occurrence of the collection period, the agent 155 parses the set of file systems (i.e., those defined by the data collection policy) to query each of the files and directories in the set of file systems identified based on the collection level to obtain file metadata associated with each file. In this step then, the agent 155 uses system calls on the host 150 to traverse the file system directories and files in order to gather the require storage information 162 (e.g., file metadata) concerning, for example, sizes of files and directories, creation and modification dates of files and directories (in order to calculate ages of files), file and directory names, file and directory ownership information, and any other file system, volume, device, partition or related data storage information 162 specified to be collected and processed according to the data collection policy 180.

In step 242, based on the file metadata for each file detected in each of the set of file systems during parsing in step 241, the agent 155 collects the storage information related to ages and sizes of files and directories for each storage entity (e.g., file system set, specific file systems, specific file set, device set, volume set, etc.) associated with the host collection level, the file system collection level of the file set collection level specified by the data collection policy 180.

In step 243, during parsing and collection of the file system metadata, the agent 155 maintains running calculations of such values as, for example, i) a running total number of files detected in each directory in the file system; ii) a running total of the amount of data maintained within the each file detected; iii) a running total of the age of each file; iv) for each directory detected in each of the set of file systems during parsing, a running total of the size of all files in that directory; v) a number of the largest files for the collection level; vi) a number of the oldest files for the collection level and so forth. Note this list is not intended to be limiting to the scope of this invention and other information can be collected as well.

By collecting this data, the agent processes 155 configured in accordance with embodiments of the invention are able to process the file system metadata as explained below to offload substantial processing burden from the storage process 140 associated with the storage area network management application 132.

Figure 5:
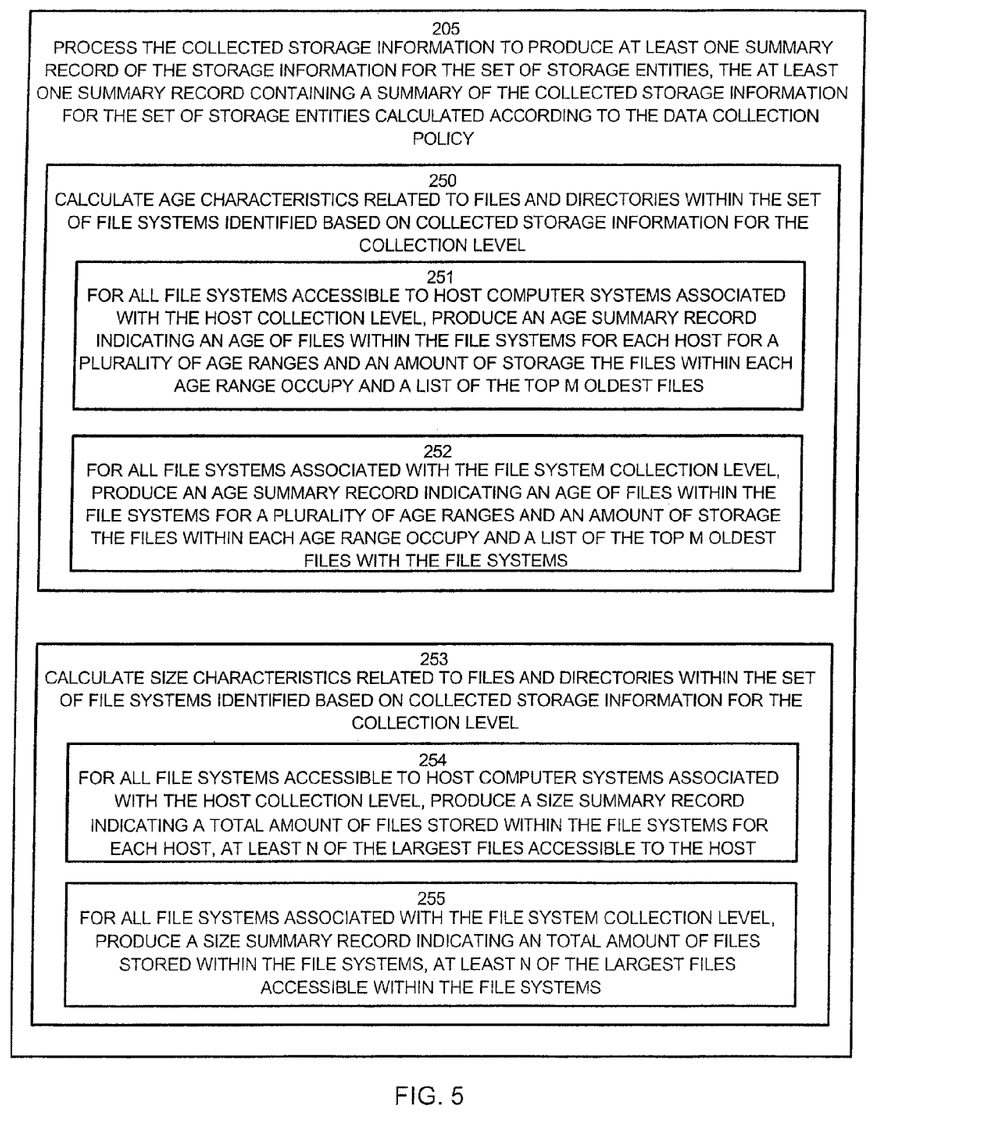
FIG. 5 is a flow chart of processing steps that show details of processing storage information collected from storage entities within an agent in accordance with embodiments of the invention.

FIG. 5 is a flow chart of processing steps that data collection agents 155 configured in accordance with embodiments of the invention perform to process the collected storage information to produce a summary record (one or more age and/or size summary records 181, 182) of the storage information for the set of storage entities.

In step 250, the agent 155 calculates age characteristics related to files and directories within the set of file systems identified based on collected storage information 162 for the collection level specified by the data collection policy 180. Example details of such calculations are shown in sub-steps 251 and 252. Sub-step 251 is applicable to a host collection level defined by the data collection policy 180 whereas sub-step 252 is applicable to a file system collection level defined by the data collection policy 180.

In step 251 (i.e., for a host collection level), for all file systems accessible to host computer system(s) 150 associated with the host collection level, the data collection agent 155 produces an age summary record 181 indicating an age of files (and directories) within the file systems for each host 155 for a plurality of age ranges. The age summary record 181 identifies an amount of storage of the files within each age range that occupy file systems associated with the host and further identifies a list of the oldest files in those file systems. Accordingly, an age summary record 181 includes calculated information relating to the ages of files and directories within file systems associated with host computer system and can indicate information such as percentages and amounts of data that are, for example, zero to thirty days old, thirty to sixty days old, sixty to ninety days old, and so forth. These are examples only and it is to be understood that other age ranges may be used as well.

In step 252, (i.e., for the file system collection level), for all file systems associated with the file system collection level, the data collection agent 155 produces an age summary record 181 indicating an age of files (and directories) within the file systems for a plurality of age ranges and an amount of storage used by the files within each age range and a list of the oldest files with those file systems.

Next, in step 253 the agent 155 calculates size characteristics related to files and directories within the set of file systems identified based on collected storage information for the collection level. Details of processing of producing size characteristics conveyed to the management application 132 as one or more size summary records 182 are shown in sub-steps 254 and 255.

In step 254 (i.e., for a host collection level), for all file systems accessible to host computer systems associated with the host collection level, the agent 155 produces a size summary record 182 indicating a total amount of files stored within the file systems for each host, a set of the largest files accessible to the host, and possibly other information such as, for example, percent of used storage space for a particular file system within particular age ranges. As an example, an agent 155 configured in accordance with an embodiment of the invention can utilize the collected file system metadata in order to determine the total size of stored data within a file system (e.g., 500 MB). In addition to this total size, the agent 155 can determine percentages of this total amount of stored data based on age ranges. That is, a size summary record can indicate what percentages of the total 500 MB of stored data are zero to thirty days old, thirty to sixty days old and so forth. This information allows the network administrator 190 to quickly determine relevant information concerning the size and the age of data stored within particular file systems 175. It is to be understood that size summary records of this nature can be calculated and produced by the agent 155 for either the host collection level (i.e., for many file systems associated with host) or for the file system collection level (i.e., for only those file systems are that match the data collection policy) or for a file set collection level (i.e., for only those files that match the data collection policy).

Next, in step 255, for all file systems associated with the file system collection level, the agent 155 produces a size summary record 182 indicating an total amount of files stored within the file systems as well as an identification of the largest files accessible within the file systems (e.g., the top 10 largest files or directories). In this manner, the agent 155 offloads such calculations from the storage or management server processes.

Based on the aforementioned processing functionality, embodiments of the invention reduce calculations required to be performed by the server and significantly reduce the amount of network bandwidth consumed to transfer information between the agent 155 and the management application 132. This is because the age and size summary records 181 and 182 reflect the calculations performed by the agent 155 and need not contain the entire set of file system metadata collected during parsing of the file system. Accordingly, network bandwidth is conserved by embodiments of the invention by requiring significantly less data to be transferred from the agent 155 to the storage process 140 or processing by the store postprocessor 145.

Generally, the functionality of the store postprocessor 145 that operates within the storage process 140 (on the management server 130) is to receive the age and size summary records 181 and 182 and process this information for storage within the managed object database 161 accessible to the management application 132 for viewing by the administrator 190. It is to be understood that while example embodiments of the invention explained above indicate that the agents 155 performing the majority of processing of the collected file system metadata, other embodiment of the invention can provide for some calculations on the collected file system metadata to be performed within the agent 155 while other calculations on summary record data 181, 182 can be performed by the store postprocessor 145 operating within the storage process 140.

As an example, according to an alternative embodiment of the invention, the agents 155 can collect file system metadata storage information 162 as explained above based upon the data collection policy 180 and can perform simpler summation calculations to obtain a total size of file systems and age ranges of files stored within those file systems. In such an embodiment, the age and size summary records 181 and 182 may not contain the complete calculations indicating, for example, percentages of used file system space according to age ranges within particular file systems. Rather, such percentage calculations (or other calculations) can be performed in this alternative embodiment of the invention by the storage process 150 once the age and size summary records 181 and 182 had been received from the agent processes 155. However, by allowing the agents 155 to provide some pre-processing of the data storage information 162, the amount of calculations required to be performed on the age and size summary records 181 and 182 is greatly reduced from that of conventional systems.

In alternative embodiments, the agents 155 still perform the calculation processing to compute average size, age ranges and so forth, but still transfer file system metadata identifying each file to the storage process 140 to allow the management application to display information such as file names, directory names and the like. In such an embodiment, the storage process does not need to perform the entire set of calculation operations required to identify file system sizes, percentage of used and available storage space, top file and directory sizes, and so forth.

The agent data collection and processing infrastructure disclosed herein may encompass a variety of alternate deployment environments. In a particular configuration, the exemplary SAN management application 132 discussed may be the EMC Control Center (ECC) application, marketed commercially by EMC corporation of Hopkinton, Mass., assignee of the present application. Agents in a management application of this invention operate in computerized devices such as host computer systems in a storage area network. Each host generally includes a network interface coupled to a network and a storage interface coupling a data storage system that maintains storage entities to the computerized device as illustrated in FIG. 1. The computerized device such as a host also includes a processor such as central processing unit and a memory system (e.g., RAM or ROM) and an interconnection mechanism such as a data bus, PCI bus or other circuitry coupling the network interface, the storage interface, the processor and the memory system. The memory system is encoded with an agent application (e.g., code for the agent 155) that, when executed on the processor, produces an agent process (e.g., an executing version of the agent 155) that operates to processes storage information concerning storage entities in a storage area network environment that are associated with the computerized device by causing the computerized device to perform the operations explained herein.

Those skilled in the art should readily appreciate that the programs and methods for processing data as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or over telephone modem or other data communication lines. The operations and methods may be implemented in a software executable object or as a set of instructions embedded in a carrier wave or other computer readable medium. Alternatively, the operations and methods disclosed herein may be embodied in whole or in part using computerized devices such as a collection of general purpose computer hardware components, Application Specific Integrated Circuits (ASICs), state machines, controllers, FPGAs, firmware or other hardware components or devices, or a combination of hardware, software, and firmware components.

While the system and method for defining, subscribing to and publishing timer events has been particularly shown and described with references to embodiments thereof, it will be understood by those skilled in the art that various changes in form and details may be made therein without departing from the scope of the invention encompassed by the appended claims. Accordingly, the present invention is not intended to be limited to the embodiments disclosed herein.

What is claimed is:

1. A computer-implemented method in which at least one computer system initiates execution of instructions retrieved from computer storage, the computer-implemented method comprising:

initiating distribution of collection policy information to each of multiple agents in a storage area network environment, the collection policy information including filter criteria and record generation criteria, the filter criteria specifying data for collection by the agents in the storage area network environment, the record generation criteria specifying how to process the data to generate summary records, the agents configured based on the collection policy information to i) collect data from resources in the storage area network, ii) produce a summary report, and iii) forward the summary report to the at least one computer system;

receiving the summary records from the multiple agents, the summary records generated by the multiple agents by processing storage information collected in the storage area network environment according to the collection policy information, the summary records including a summary of collected storage information calculated according to the collection policy information; and storing the summary records in a repository.

2. The computer-implemented method as in claim 1, wherein initiating distribution of collection policy information comprises:

via the collection policy information, notifying the multiple agents to produce the summary records based on age and size characteristics associated with file systems accessible to the multiple agents.

3. The computer-implemented method as in claim 2, wherein notifying the multiple agents to produce the summary records based on age and size characteristics includes:

notifying a respective agent to generate a summary record based on calculation of an average file size associated with a file system that is accessed by the respective agent.

4. The computer-implemented method as in claim 1, wherein the filter criteria specifies a collection level identifying a set of files in a respective file system from which the data for collection for collection by the agents and processed by the agents to produce the summary records.

5. The computer-implemented method as in claim 1, wherein the filter criteria specifies a collection level identifying a set of files in a respective file system from which the data for collection by the agents and processing by the agents to produce the summary records, the collection level specifying a particular type of resource in the storage area network environment having related data stored in the set of files, the particular type of resource being one of multiple types of resources in the storage area network environment.

6. The computer-implemented method as in claim 1, wherein initiating distribution of collection policy information comprises:

notifying a given agent of a particular resource in the storage area network environment, the particular resource having access to a file system; and subsequent to the given agent accessing and processing file information associated with the file system, receiving a summary record from the given agent, the summary record generated by the given agent based on the file system accessible to the particular resource.

7. The computer-implemented method as in claim 6, wherein the given agent, to produce the summary record, collects age information and size information associated with files in the file system, the files being accessible to the particular resource; and wherein the given agent produces the summary record based on the age information and size information associated with the files in the file system.

8. The computer-implemented method as in claim 7, wherein the given agent applies an averaging function, as specified by the record generation criteria, to the age information and the size information associated with files in the file system to produce the summary record.

9. The computer-implemented method as in claim 1, wherein the filter criteria specifies a collection period value indicating how often to perform collection of the data;

wherein a given agent of the multiple agents utilizes the filter criteria to detect the collection period; and wherein, based on the collection period, the given agent parses a set of files as specified by the record generation criteria to produce a respective summary record.

10. The computer-implemented method as in claim 9, wherein initiating distribution of collection policy information comprises:

via the collection policy information, notifying the multiple agents to produce the summary records based on age and size characteristics associated with file systems accessible to the multiple agents; and wherein notifying the multiple agents to produce the summary records based on age and size characteristics includes: notifying a respective agent to generate a summary record based on calculation of an average file size associated with a file system accessed by the respective agent.

11. The computer-implemented method as in claim 1, wherein the multiple agents utilize the collection policy information to calculate:

i) a running total number of multiple files detected in a directory of a file system;

ii) a running total of the amount of data maintained within each of the 30 multiple files;

iii) a running total of the age of each file of the multiple files;

iv) for each respective directory of multiple detected directories, a running total of the size of files in the respective directory;

v) a number N of largest files of the multiple files; or vi) a number M of oldest files of the multiple for the collection level.

12. The computer-implemented method as in claim 1, wherein the collection policy information notifies the multiple agents to:

calculate age characteristics related to files and directories as specified by the filter criteria; and calculate size characteristics related to files and directories as specified by the filter criteria.

13. The computer-implemented method as in claim 1, wherein the filter criteria indicates data associated with files in the storage area network in which to collect the data to generate the summary records.

14. The computer-implemented method as in claim 13, wherein the record generation criteria indicates to generate the summary records based on ages of files in the storage area network.

15. A computer-readable storage medium having instructions stored thereon for processing data information, such that the instructions, when carried out by a processing device, enable the processing device to perform operations of:

initiating distribution of collection policy information to each of multiple agents in a storage area network environment, the collection policy information including filter criteria and record generation criteria, the filter criteria specifying data for collection by the agents in the storage area network environment, the record generation criteria specifying how to process the data to generate summary records, the agents configured based on the collection policy information to i) collect data from resources in the storage area network, ii) produce a summary report, and iii) forward the summary report to the at least one computer system;

receiving the summary records from the multiple agents, the summary records generated by the multiple agents by processing storage information collected in the storage area network environment according to the collection policy information, the summary records including a summary of collected storage information calculated according to the collection policy information; and storing the summary records in a repository.

16. The computer-readable storage medium as in claim 15, wherein initiating distribution of collection policy information comprises: notifying a given agent of a particular resource in the storage area network environment, the particular resource having access to a file system, the computer readable storage medium further supporting:

subsequent to the given agent accessing and processing file information associated with the file system, receiving a summary record from the given agent, the summary record generated by the given agent based on the file system accessible to the particular resource.

17. The computer-readable storage medium as in claim 15, wherein the given agent collects age information and size information associated with files in the file system accessible to the particular resource to produce the summary record; and wherein the given agent produces the summary record based on the age information and size information associated with the files in the file system, the files in the file system being accessed by the particular resource.

18. A computer system comprising:

a processor;

a memory system;

an interconnect coupling the processor and the memory system;

wherein the memory system is encoded with instructions executed by the processor to perform operations of:

receiving, from a storage management application, a data collection policy identifying storage information for collection concerning a set of storage entities that the computer system maintains in the data storage system;

based on receipt of the data collection policy from the storage management application, configuring a data collection agent as one of multiple software agents, each of which i) collects data from resources in the storage area network, ii) produces a summary report, and iii) forwards the summary report to the storage management application;

collecting storage information concerning the set of storage entities according to the data collection policy;

processing the collected storage information to produce at least one summary record of the storage information for the set of storage entities, the at least one summary record including a summary of collected storage information for the set of storage entities calculated according to the data collection policy; and transferring, via a network interface, the at least one summary record from the data collection agent to the storage management application for presentation to a user of the storage management application.

19. The computer system of claim 18 wherein the data collection policy specifies a file system collection level and wherein collecting storage information concerning the set of storage entities according to the data collection policy comprises: for each file system as specified by the file system collection level, collecting storage information related to the sizes and ages of files and directories within that file system; and wherein processing the collected storage information to produce at least one summary record of the storage information for the set of storage entities comprises: for each file system defined by the file system collection level, producing a size summary record and an age summary record by applying averaging functions to the storage information related to the sizes and ages of files and directories within that file system.

20. The computer system of claim 18 wherein the data collection policy received specifies a file set collection level indicating a specific set of files for which storage information for collection by the agent, and wherein collecting storage information concerning the set of storage entities according to the data collection policy comprises: for each file defined by the file set collection level, collecting storage information related to the size and age of that file; and wherein processing the collected storage information to produce at least one summary record of the storage information for the set of storage entities comprises: for all files defined by the file set collection level, producing a size summary record and an age summary record by applying averaging functions to the storage information related to the sizes and ages of the files identified by the file set collection level.

* * * * *